United States Patent
Choi et al.

(10) Patent No.: US 10,349,046 B2
(45) Date of Patent: Jul. 9, 2019

(54) IMAGE DISPLAY APPARATUS AND METHOD OF DISPLAYING IMAGE FOR DISPLAYING 360-DEGREE IMAGE ON PLURALITY OF SCREENS, EACH SCREEN REPRESENTING A DIFFERENT ANGLE OF THE 360-DEGREE IMAGE

(71) Applicant: SAMSUNG ELECTRONICS CO., LTD., Suwon-si, Gyeonggi-do (KR)

(72) Inventors: Kil-soo Choi, Yongin-si (KR); Young-il Kim, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 19 days.

(21) Appl. No.: 15/634,063

(22) Filed: Jun. 27, 2017

(65) Prior Publication Data
US 2018/0035105 A1    Feb. 1, 2018

(30) Foreign Application Priority Data
Jul. 28, 2016  (KR) .................. 10-2016-0096130

(51) Int. Cl.
*H04N 13/398*    (2018.01)
*G09G 5/14*    (2006.01)
(Continued)

(52) U.S. Cl.
CPC ......... *H04N 13/398* (2018.05); *G06F 3/0485* (2013.01); *G06F 3/04845* (2013.01);
(Continued)

(58) Field of Classification Search
CPC ............. H04N 13/398; H04N 21/816; H04N 21/4728; H04N 21/4316; H04N 21/6587;
(Continued)

(56) References Cited

U.S. PATENT DOCUMENTS

2002/0021353 A1  2/2002 DeNies
2010/0123737 A1  5/2010 Williamson et al.
(Continued)

FOREIGN PATENT DOCUMENTS

CN    101090460    12/2007
CN    102780871    11/2012
(Continued)

OTHER PUBLICATIONS

Search Report and Written Opinion dated Oct. 30, 2017 in counterpart International Patent Application No. PCT/KR2017/006740.
(Continued)

*Primary Examiner* — Maurice L. McDowell, Jr.
(74) *Attorney, Agent, or Firm* — Nixon & Vanderhye P.C.

(57) ABSTRACT

An image display apparatus and an image display method are provided. The image display apparatus for displaying a 360-degree image includes a display; a memory comprising at least one instruction; and a processor, by executing the at least one instruction stored in the memory, is configured to control the display to display at least a part of a 360-degree image on a plurality of screens in which each of the plurality of screens represents images corresponding to different angles of view of the 360-degree image, to change display properties of one or more other screens of the plurality of screens in response to receiving an input that moves an angle of view on one of the plurality of screens, and to control the display to display at least a part of the 360-degree image on the one or more other screens having the changed display properties.

18 Claims, 15 Drawing Sheets

(51) Int. Cl.
*H04N 21/431* (2011.01)
*H04N 21/4728* (2011.01)
*H04N 21/6587* (2011.01)
*H04N 21/81* (2011.01)
*G06F 3/0484* (2013.01)
*G06F 3/0485* (2013.01)
*G06T 19/00* (2011.01)
*H04N 5/232* (2006.01)
*H04N 5/262* (2006.01)
*G06F 3/14* (2006.01)

(52) U.S. Cl.
CPC ............ *G06T 19/003* (2013.01); *G09G 5/14* (2013.01); *H04N 5/23238* (2013.01); *H04N 5/2624* (2013.01); *H04N 21/4316* (2013.01); *H04N 21/4728* (2013.01); *H04N 21/6587* (2013.01); *H04N 21/816* (2013.01); *G06F 3/14* (2013.01); *G09G 2340/045* (2013.01)

(58) Field of Classification Search
CPC ............ H04N 5/2624; H04N 5/23238; G06F 3/0485; G06F 3/04845; G06F 3/14; G09G 5/14; G09G 2340/045; G06T 19/003
See application file for complete search history.

(56) References Cited

U.S. PATENT DOCUMENTS

| | | |
|---|---|---|
| 2012/0086771 A1 | 4/2012 | Wang et al. |
| 2014/0192212 A1 | 7/2014 | He et al. |
| 2014/0359656 A1 | 12/2014 | Banica et al. |
| 2016/0132991 A1 | 5/2016 | Fukushi |
| 2016/0133044 A1 | 5/2016 | Lynch |
| 2016/0328824 A1 | 11/2016 | Kim et al. |
| 2017/0195615 A1* | 7/2017 | Han .................. H04N 21/4316 |

FOREIGN PATENT DOCUMENTS

| | | |
|---|---|---|
| CN | 103179333 | 6/2013 |
| DE | 198 43 919 | 3/2000 |
| JP | 2015-015583 | 1/2015 |
| KR | 10-2013-0024357 | 3/2013 |
| KR | 10-1518814 | 5/2015 |
| KR | 10-2015-0068299 | 6/2015 |
| KR | 10-2016-0018719 | 2/2016 |
| WO | WO 2011/103463 | 8/2011 |

OTHER PUBLICATIONS

Extended European Search Report for EP Application No. 17834639.1 dated Feb. 11, 2019.

* cited by examiner

FIG. 7A
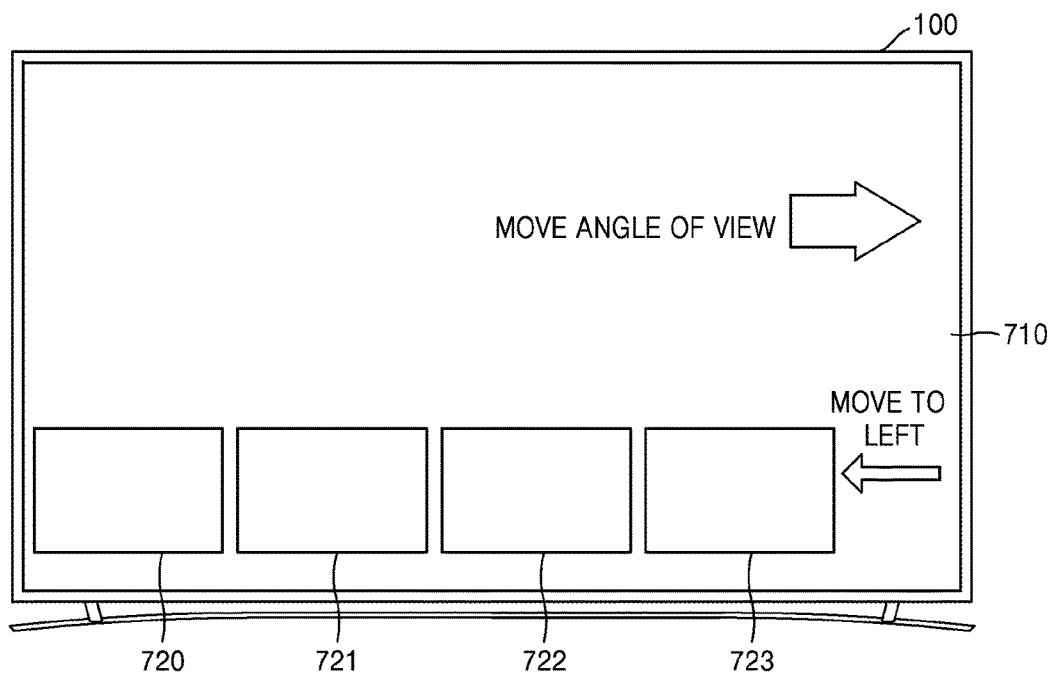
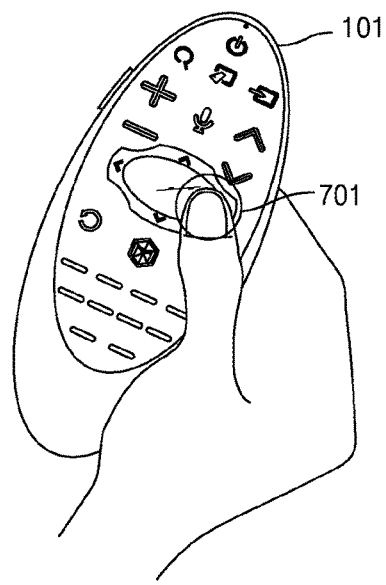

FIG. 7B
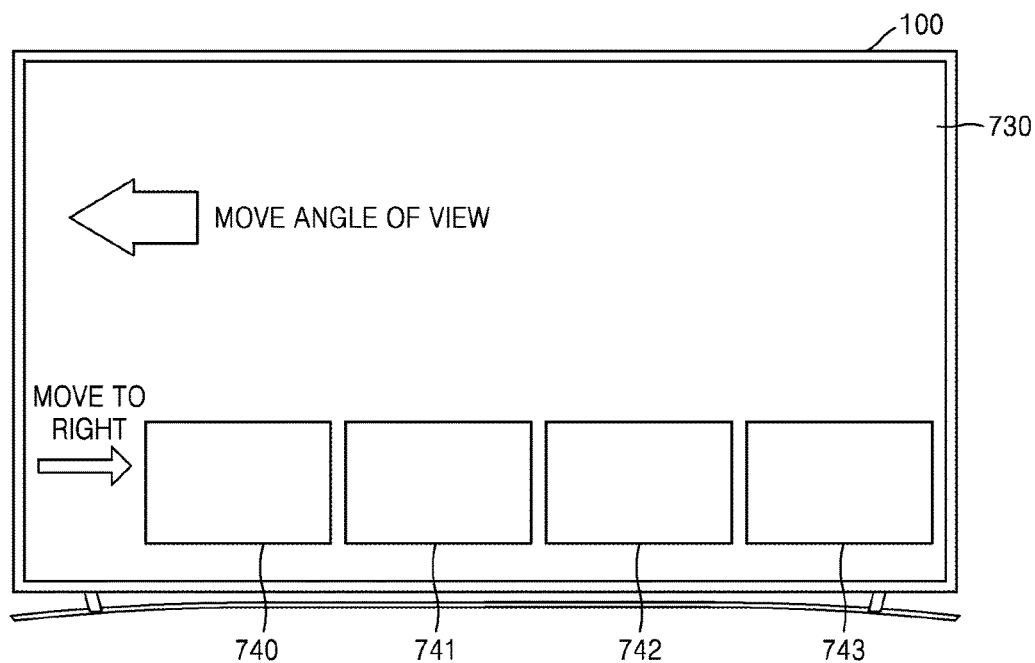
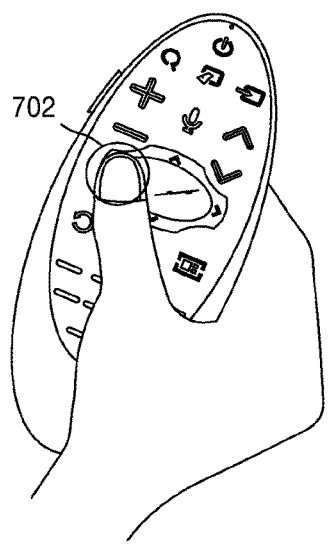

FIG. 8
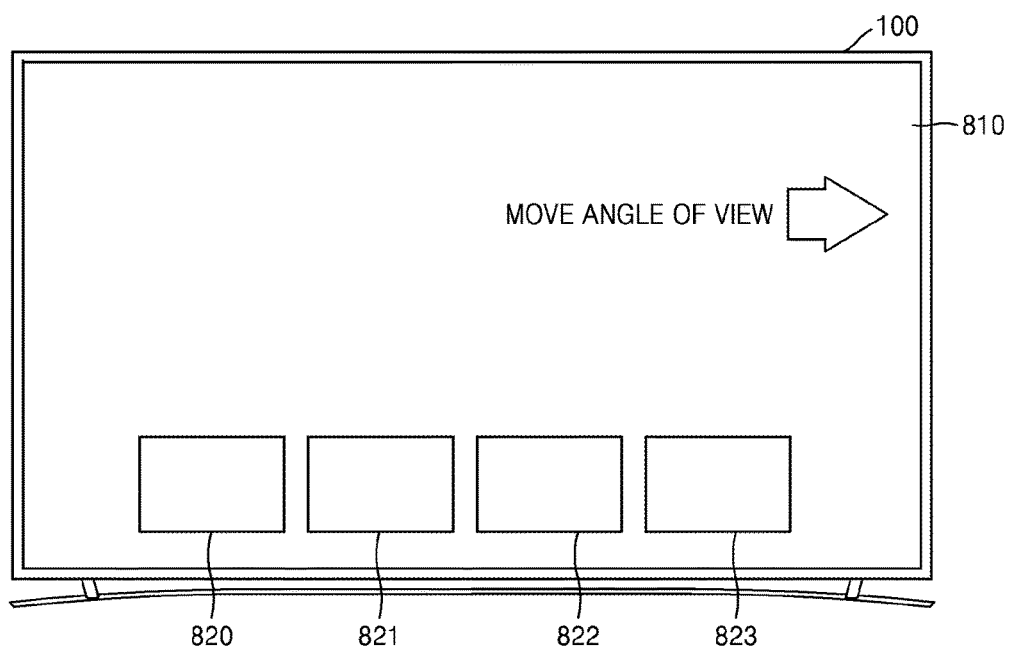
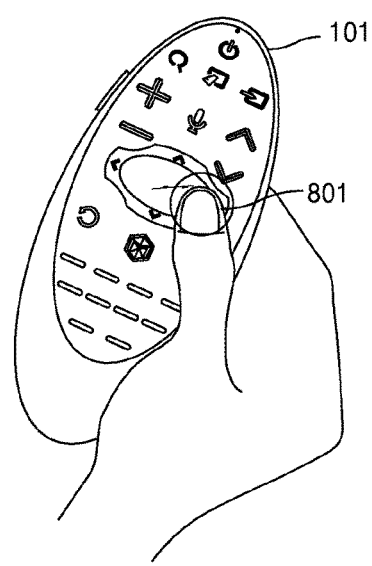

FIG. 9A
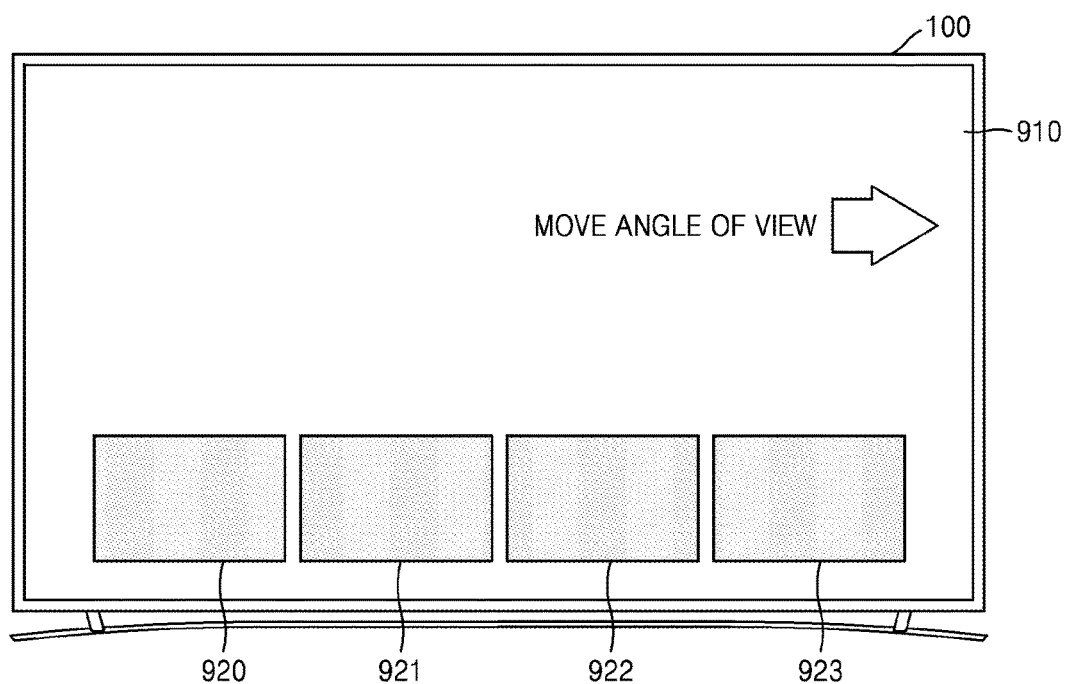
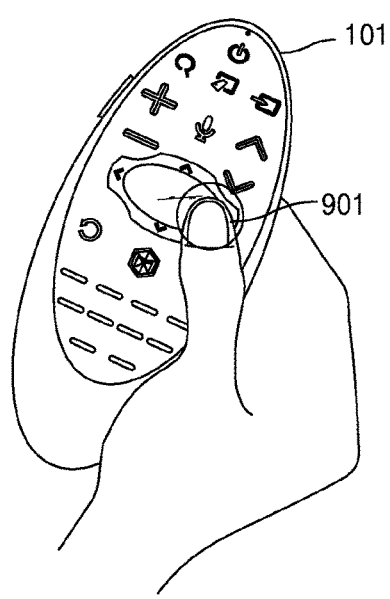

FIG. 9B
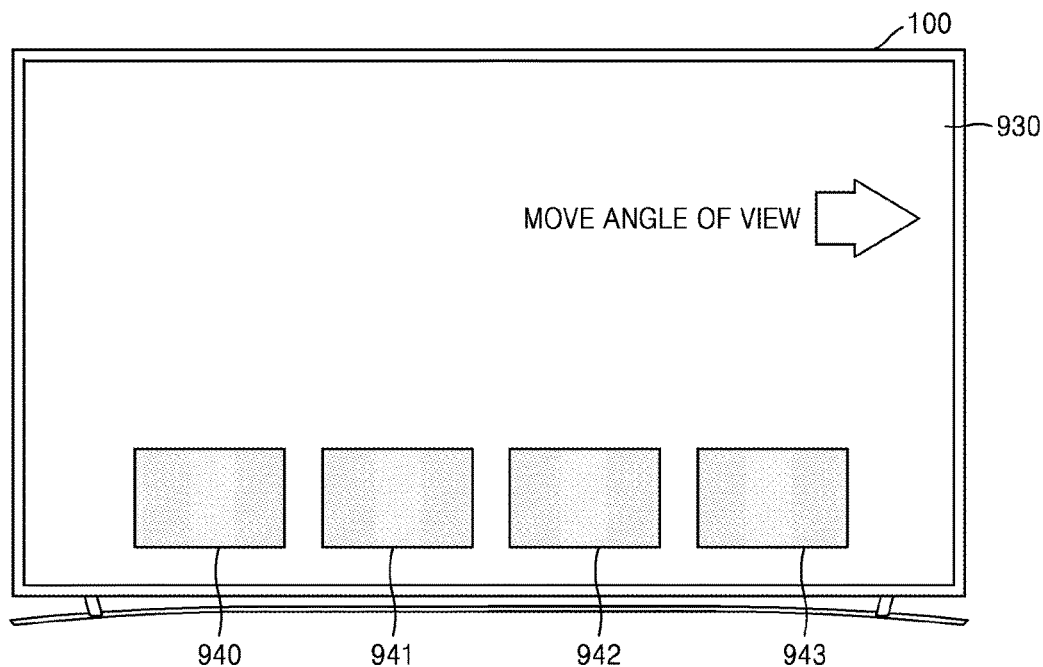
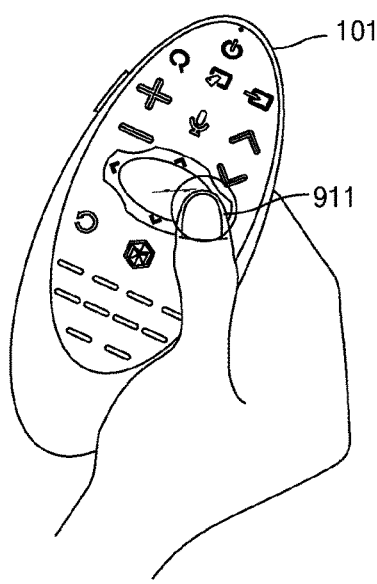

FIG. 10A
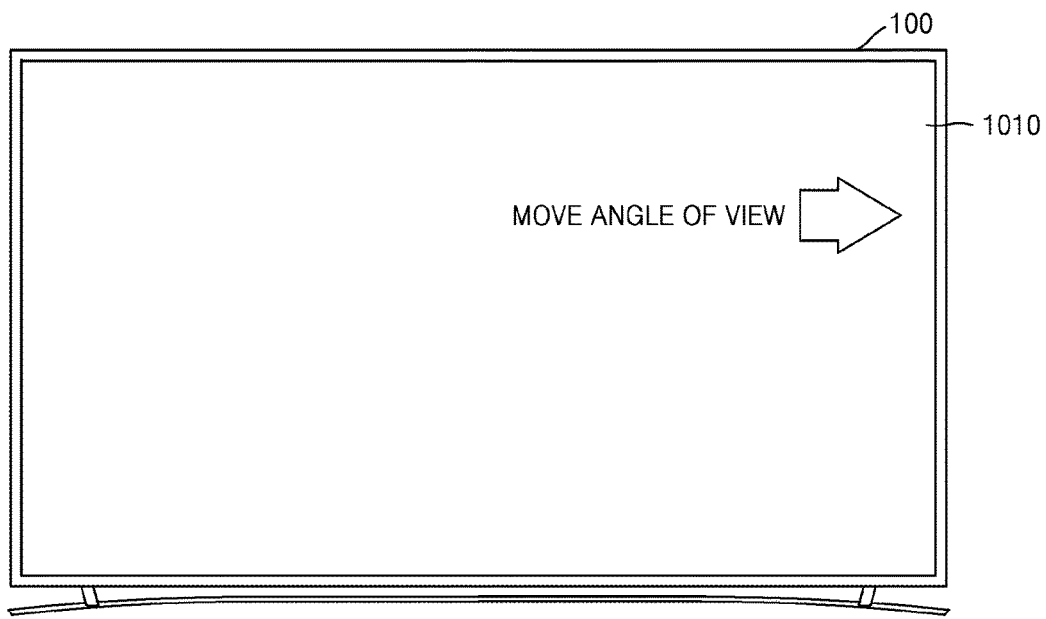
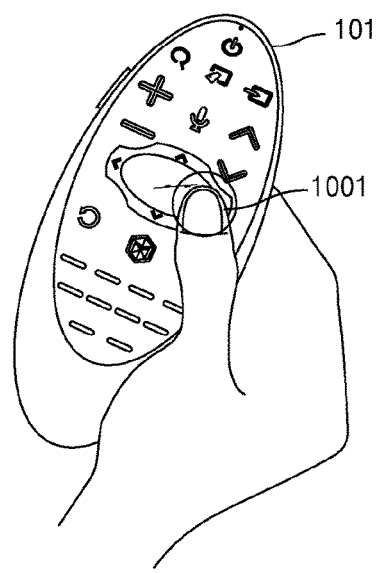

FIG. 10B
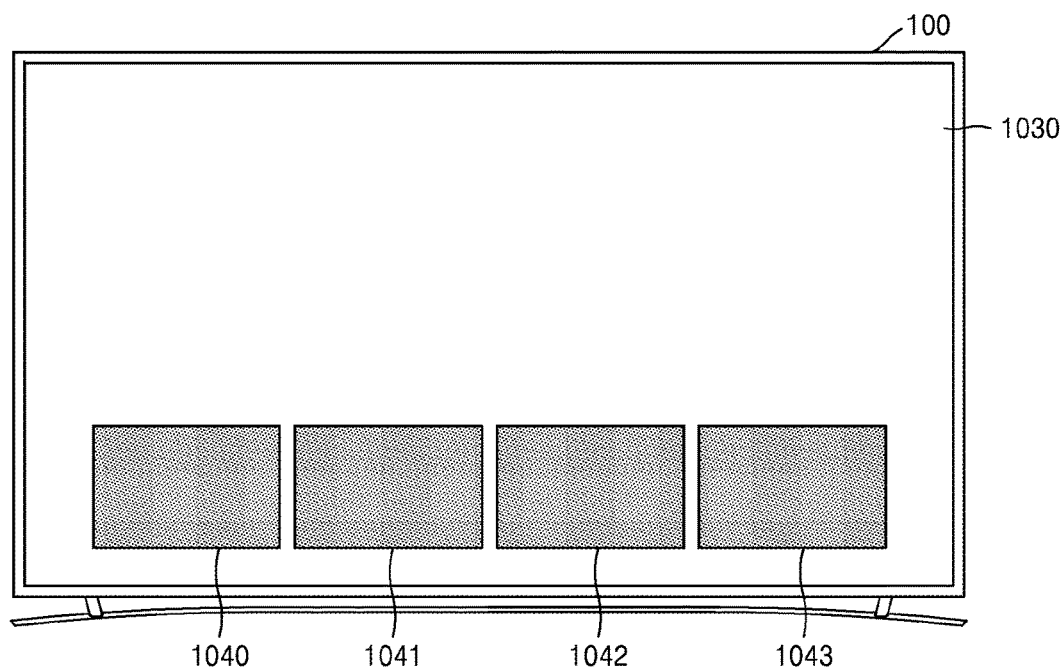
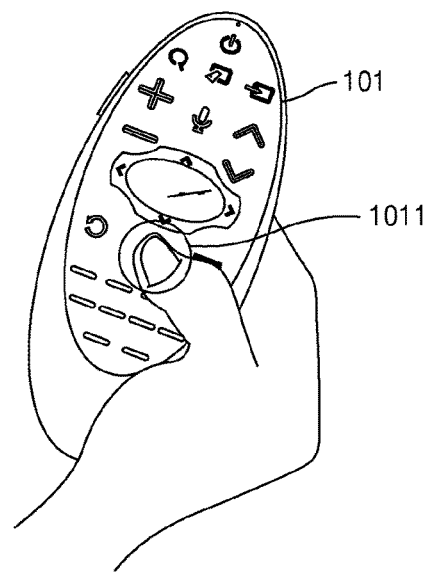

IMAGE DISPLAY APPARATUS AND METHOD OF DISPLAYING IMAGE FOR DISPLAYING 360-DEGREE IMAGE ON PLURALITY OF SCREENS, EACH SCREEN REPRESENTING A DIFFERENT ANGLE OF THE 360-DEGREE IMAGE

CROSS-REFERENCE TO RELATED APPLICATION

This application is based on and claims priority under 35 U.S.C. § 119 to Korean Patent Application No. 10-2016-0096130, filed on Jul. 28, 2016, in the Korean Intellectual Property Office, the disclosure of which is incorporated by reference herein in its entirety.

BACKGROUND

1. Field

The present disclosure relates generally to image display apparatuses and methods, and for example, to an image display apparatus and method of displaying a 360-degree image.

2. Description of Related Art

An image display apparatus has a function of displaying an image to a user. The user may view a broadcast on the image display apparatus. The image display apparatus may display a broadcast selected by a user among broadcast signals transmitted from a broadcasting station on a display. At present, there is a trend that analog broadcasts are switched to digital broadcasts.

In a digital broadcast, a digital image is transmitted along with a sound signal. The digital broadcast is robust to external noise and thus data loss thereof is low. Furthermore, the digital broadcast is advantageous in terms of error correction, has a high resolution, and provides a clear picture compared to an analog broadcast. In addition, the digital broadcast may be serviced bi-directionally, unlike the analog broadcast.

Recently, smart televisions (TVs) having a digital broadcast function and providing various types of content and image display apparatuses capable of displaying a 360-degree image have been provided. A user may view a 360-degree image from various angles by moving a view-angle of a 360-degree image. Therefore, there is a need to develop a method that allows the user to conveniently view the 360-degree image from various angles.

SUMMARY

According to an aspect of an example embodiment, an image display apparatus for displaying a 360-degree image includes a display; a memory including at least one instruction; and a processor, by executing the at least one instruction stored in the memory, configured to control the display to display at least a part of a 360-degree image on a plurality of screens in which each of the plurality of screens represents images corresponding to different angles of view of the 360-degree image, to change display properties of one or more other screens from among the plurality of screens in response to receiving an input that moves an angle of view on one of the plurality of screens, and to control the display to display at least a part of the 360-degree image on the one or more other screens having the changed display properties.

The display properties include at least one of locations of the one or more other screens, sizes, transparency, and an on/off state thereof.

The processor may be configured to move the one or more other screens from among the plurality of screens in an opposite direction to a predetermined direction in response to an input that moves the angles of view of the 360-degree image in the predetermined direction on the one of the plurality of screens by executing the at least one instruction stored in the memory.

The processor may reduce sizes of the one or more other screens from among the plurality of screens in response to an input that moves the angles of view of the 360-degree image on the one of the plurality of screens by executing the at least one instruction stored in the memory.

The processor may change transparency of the one or more other screens from among the plurality of screens in response to an input that moves the angles of view of the 360-degree image on the one of the plurality of screens by executing the at least one instruction stored in the memory The processor may control the display to not display the one or more other screens from among the plurality of screens while receiving a user input that moves the angles of view of the 360-degree image on the one of the plurality of screens by executing the at least one instruction stored in the memory.

The processor may control the display to display again the one or more other screens from among the plurality of screens that have not been displayed since receiving of the user input that moves the angles of view of the 360-degree image ends and a predetermined time elapses by executing the at least one instruction stored in the memory.

The processor may control the display to display again the one or more other screens from among the plurality of screens that have not been displayed in response to an input that selects the one or more other screens since receiving of the input that moves the angles of view of the 360-degree image ends by executing the at least one instruction stored in the memory.

The image display apparatus may further include: an input device comprising input circuitry configured to receive an input that moves the angles of view of the 360-degree image.

According to an aspect of another example embodiment, a method of displaying a 360-degree image includes displaying at least a part of a 360-degree image on a plurality of screens in which each of the plurality of screens represents images corresponding to different angles of view of the 360-degree image; changing display properties of one or more other screens from among the plurality of screens in response to receiving an input that moves an angle of view on one of the plurality of screens; and displaying at least a part of the 360-degree image on the one or more other screens having the changed display properties.

The display properties may include at least one of locations of the one or more other screens, sizes, transparency, and an on/off state thereof.

The changing of the display properties of one or more other screens may include: moving the one or more other screens from among the plurality of screens in an opposite direction to a predetermined direction in response to an input that moves the angles of view of the 360-degree image in the predetermined direction on the one of the plurality of screens.

The changing of the display properties of one or more other screens may include: reducing sizes of the one or more other screens from among the plurality of screens in response to an input that moves the angles of view of the 360-degree image on the one of the plurality of screens.

The changing of the display properties of one or more other screens may include: changing transparency of the one or more other screens from among the plurality of screens in response to an input that moves the angles of view of the 360-degree image on the one of the plurality of screens.

The changing of the display properties of one or more other screens may include: controlling the one or more other screens from among the plurality of screens to not be displayed when receiving an input that moves the angles of view of the 360-degree image on the one of the plurality of screens.

The method may further include: displaying again the one or more other screens from among the plurality of screens that have not been displayed since receiving of the input that moves the angles of view of the 360-degree image ends and a predetermined time elapses.

The method may further include: displaying again the one or more other screens from among the plurality of screens that have not been displayed in response to an input that selects the one or more other screens since receiving of the input that moves the angles of view of the 360-degree image ends.

The method may further include: receiving an input that moves the angles of view of the 360-degree image.

BRIEF DESCRIPTION OF THE DRAWINGS

These and/or other aspects, features and attendant advantages of the present disclosure will become apparent and more readily appreciated from the following detailed description, taken in conjunction with the accompanying drawings, in which like reference numerals refer to like elements, and wherein:

FIGS. 7A and 7B are diagrams illustrating an example method of changing locations of a plurality of screens, according to an example embodiment;

FIG. 8 is a diagram illustrating an example method of changing sizes of a plurality of screens, according to an example embodiment;

FIGS. 9A and 9B are diagrams illustrating an example method of changing transparency of a plurality of screens, according to an example embodiment;

FIGS. 10A and 10B are diagrams illustrating an example method of changing an on/off state of a plurality of screens, according to an example embodiment.

DETAILED DESCRIPTION

Figure 1:
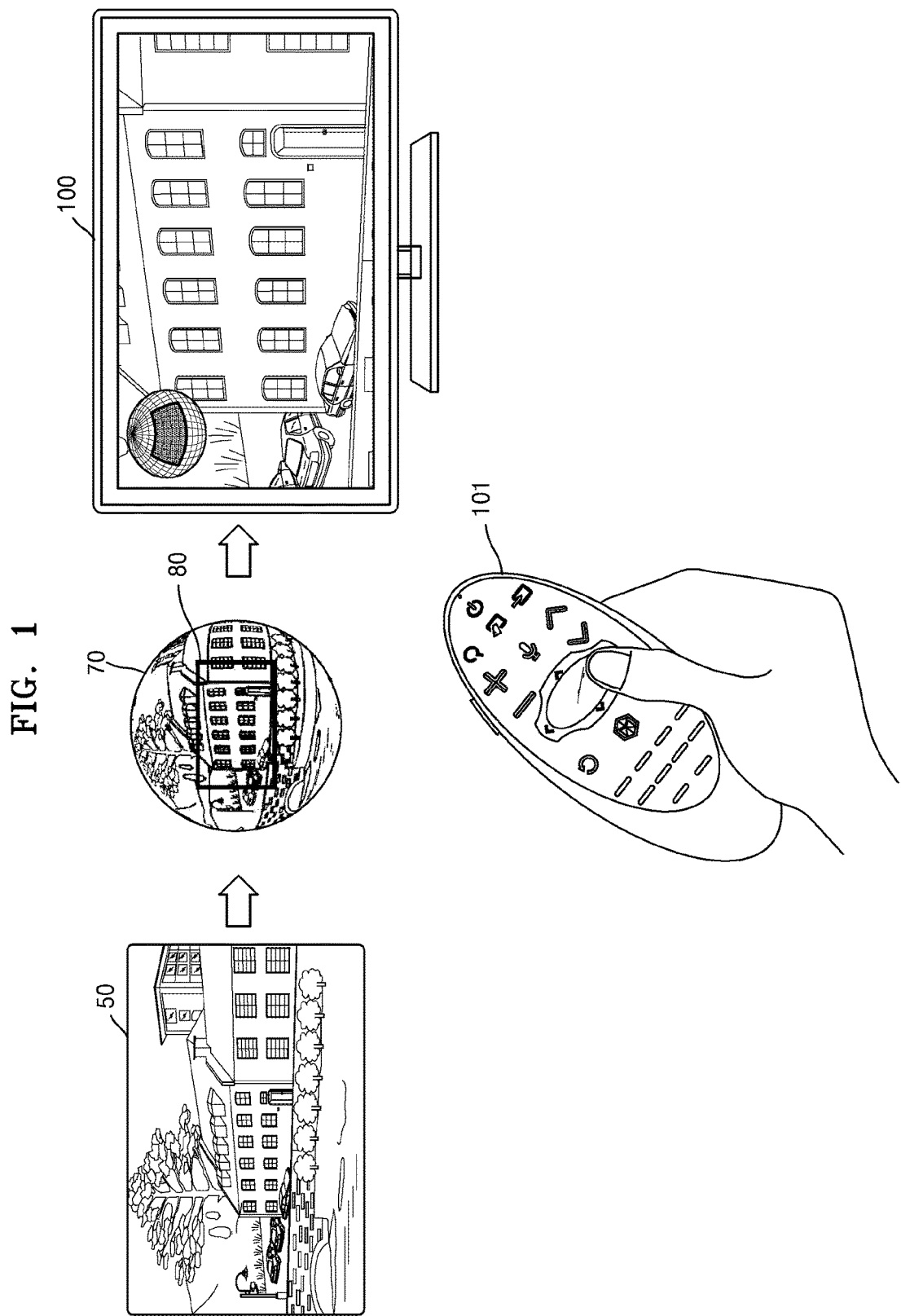
FIG. 1 is a diagram illustrating an example image display apparatus for displaying a 360-degree image, according to an example embodiment.

Hereinafter, various example embodiments of the present disclosure will be described in greater detail with reference to the accompanying drawings so that those of ordinary skill in the art can easily accomplish them. However, the present disclosure may be embodied in many different forms and should not be construed as being limited to the embodiments set forth herein. For clarity, parts that are not related to describing these embodiments may be omitted in the drawings. Throughout the disclosure, like reference numerals are assigned to like elements.

In the present disclosure, general terms that have been widely used nowadays are selected, if possible, in consideration of functions mentioned in the present disclosure, but non-general terms may be selected according to the intentions of technicians in the this art, precedents, or new technologies, etc. Thus, the terms used herein should be defined not based on the names thereof but based on the meanings thereof and the whole context of the present disclosure.

The terminology used herein is for the purpose of describing particular embodiments only and is not intended to be limiting of the present disclosure. As used herein, the singular forms 'a', 'an' and 'the' are intended to include the plural forms as well, unless the context clearly indicates otherwise. It will be understood that when an element or layer is referred to as being 'connected to' another element or layer, the element or layer can be directly connected to another element or layer or can be electrically connected to another element or layer while having intervening elements or layers therebetween. It will be further understood that the terms 'comprise' and/or 'comprising,' when used in this disclosure, specify the presence of stated features, integers, steps, operations, elements, and/or components, but do not preclude the presence or addition of one or more other features, integers, steps, operations, elements, components, and/or groups thereof.

In the present disclosure, and particularly, in the claims, the term 'the' and demonstratives similar thereto may be understood to include both singular and plural forms. The operations of all methods described herein can be performed in an appropriate order unless otherwise indicated herein or otherwise clearly contradicted by context. The present disclosure is not limited by the orders in which the operations of the methods are described herein.

Throughout the present disclosure, the expression 'in some embodiments', 'in one embodiment', etc. may or may not indicate the same embodiments.

In the present disclosure, some elements may be represented using functional block components and various operations. All or some of the functional blocks may be realized by any number of hardware and/or software components configured to perform specified functions. For example, in the present disclosure, the functional blocks may be realized by one or more microprocessors or by circuit components configured to perform a certain function. For example, in the present disclosure, the functional blocks may be implemented with any programming or scripting language. The functional blocks may be embodied as an algorithm executed by one or more processors. Furthermore, the present disclosure may employ conventional techniques for electronics configuration, signal processing and/or data processing. The terms 'mechanism', 'element', 'means', 'configuration', etc. are used broadly and are not limited to mechanical or physical embodiments.

Furthermore, the lines or connecting elements shown in the appended drawings are intended to represent example functional relationships and/or physical or logical couplings between various elements. It should be noted that many alternative or additional functional relationships, physical connections or logical connections may be present in a practical device.

As used herein, the term "and/or" includes any and all combinations of one or more of the associated listed items. Expressions such as 'at least one of,' when preceding a list of elements, modify the entire list of elements and do not modify the individual elements of the list.

Hereinafter, the present disclosure will be described in greater detail with reference to the accompanying drawings.

FIG. 1 is a diagram illustrating an example image display apparatus 100 for displaying a 360-degree image, according to an example embodiment.

Referring to FIG. 1, the image display apparatus 100 according to an example embodiment is capable of displaying a 360-degree image.

The 360-degree image may be a 360-degree view-angle image. For example, the 360-degree image may be generated based on a plurality of images captured in a 360-degree direction by using at least one camera. In this case, the plurality of captured images may be mapped to a sphere and points of contact of the mapped images may be connected (stitched) to one another to form a 360-degree image having a sphere shape. The 360-degree image having a sphere shape may be converted into a 360-degree image 50 having a planar shape to be transmitted to or stored in another device, as illustrated in FIG. 1. A detailed description of a 360-degree view-angle will be provided with reference to FIG. 2 below.

In an example embodiment, the image display apparatus 100 may perform graphics processing on the 360-degree image 50 having a planar shape to convert the 360-degree image 50 into a 360-degree image 70 having a sphere shape. For example, the image display apparatus 100 may generate the 360-degree image 70 having a sphere shape by mapping a 360-degree image having a planar shape to a sphere.

The image display apparatus 100 may select an area 80 corresponding to a specific viewpoint of the 360-degree image 70 having a sphere shape, and display an image corresponding to the selected area 80.

As illustrated in FIG. 1, the image display apparatus 100 may be a television (TV) but is not limited thereto and may be embodied as an electronic apparatus having a display. For example, the image display apparatus 100 may be embodied as any electronic device, such as, for example, and without limitation, a cellular phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, a wearable device, or the like. Furthermore, the image display apparatus 100 may be of a fixed type or a portable type and may be a digital broadcast receiver capable of receiving a digital broadcast.

The image display apparatus 100 may be embodied as a curved display apparatus having a curved screen or a flexible display apparatus having an adjustable curvature, as well as a flat display apparatus. Resolutions of outputs of the image display apparatus 100 may include, for example, high definition (HD), full HD, ultra HD, and a resolution higher than ultra HD.

The image display apparatus 100 may be controlled by a control device 101. The control device 101 may be embodied as devices having various shapes and capable of controlling the image display apparatus 100, e.g., a remote controller or a cellular phone. Alternatively, when a display of the image display apparatus 100 is a touch screen, the control device 101 may be a user's finger, an input pen, or the like.

Furthermore, the control device 101 may control the image display apparatus 100 through short-range communication, including infrared communication or Bluetooth. The control device 101 may control functions of the image display apparatus 100 using at least one among keys (including buttons), a touchpad, a microphone (not shown) through which a user's voice may be received, and a sensor (not shown) capable of sensing a motion of the control device 101 which are installed in the control device 101.

The control device 101 may include a power on/off button for turning the image display apparatus 100 on or off. Furthermore, the control device 101 may change channels of the image display apparatus 100, adjust the volume of the image display apparatus 100, and select a terrestrial broadcast, a cable broadcast, or a satellite broadcast, or perform environment settings according to a user's input.

Alternatively, the control device 101 may be a pointing device. For example, the control device 101 may serve as a pointing device when a specific key input is received.

In embodiments of the present disclosure, the term 'user' means a person who controls functions or operations of the image display apparatus 100 by using the control device 101 and should be understood to be a viewer, a manager, and an installation engineer.

Figure 2:
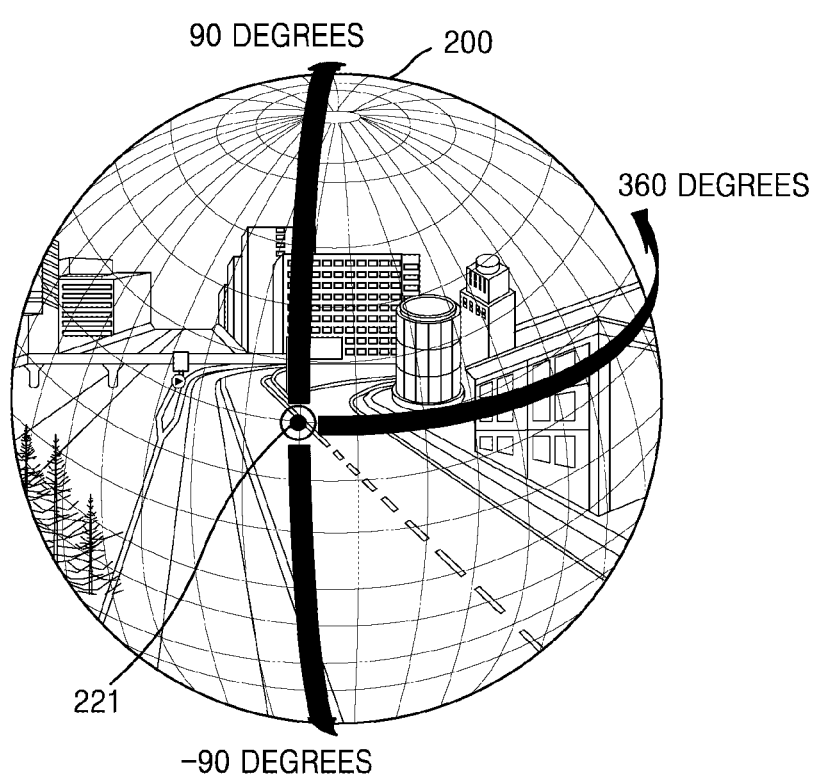
FIG. 2 is a diagram illustrating an example view-angle of a 360-degree image.

FIG. 2 is a diagram illustrating an example view-angle of a 360-degree image.

As described above, the 360-degree image may be generated based on a plurality of images captured in a 360-degree direction by using at least one camera. In this case, the plurality of captured images may be mapped to a sphere and points of contact of the mapped images may be connected (stitched) to one another to form a 360-degree image having a sphere shape.

The 360-degree image may mean an image having a 360-degree angle of view. When the 360-degree image is expressed as an image 200 having a sphere shape, an angle of view of the 360-degree image may mean an angle formed by rotating a surface of a sphere with respect to a first plane parallel to an x-y plane while passing a center of the sphere or a second plane parallel to a z plane while passing the center of the sphere. For example, referring to FIG. 2, an angle of view of a predetermined point 221 located on the surface of the sphere in the image 200 having a sphere shape may be set as 0 degrees. In this regard, the angle of view of the 360-degree image may have a value from 0 to 360 degrees with respect to the first plane and may have a value from −90 degrees to 90 degrees with respect to the second plane. Alternatively, according to an embodiment, the angle of view of the 360-degree image may have a value from 0 degrees to 180 degrees with respect to the second plane but is not limited to the above-described example.

Figure 3:
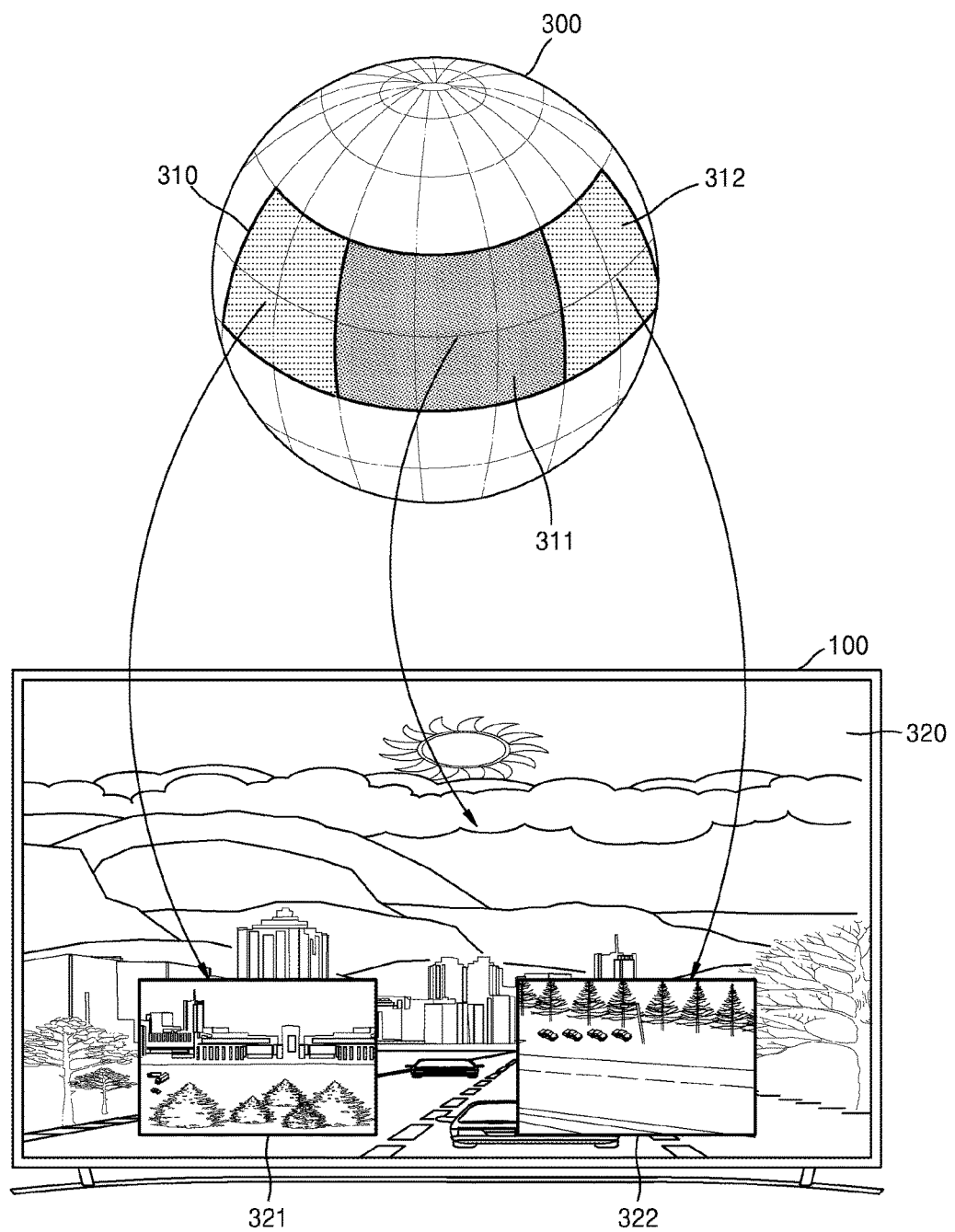
FIG. 3 is a diagram illustrating an example method of displaying a 360-degree image, according to an example embodiment.

FIG. 3 is a diagram illustrating an example method of displaying a 360-degree image, according to an example embodiment.

In order for a user to view the 360-degree image at various angles, the image display apparatus 100 may display at least a part of the 360-degree image on a plurality of screens. For example, the image display apparatus 100 may display images corresponding to different angles of view of the 360-degree image on the plurality of screens. In this regard, the plurality of screens may represent a plurality of sub-screens that are split from one display screen. One or more sub screens of the plurality of sub screens according to an embodiment may overlap and be displayed on different sub screens. Alternatively, according to a different embodiment, the plurality of sub screens may not overlap each other and may be displayed on different regions of a display.

For example, the image display apparatus 100 may display the 360-degree image on three screens. In this regard, the image display apparatus 100 may display images corresponding to different angles of view of the 360-degree image on the three screens. Referring to FIG. 3, a 360-degree image 300 having a sphere shape, images corresponding to first through third regions 310, 311 and 312 may represent images corresponding to different angles of view. Accordingly, the image display apparatus 100 may display an image corresponding to the second region 311 located in front of the 360-degree image 300 having a sphere shape on a first screen 320 among the plurality of screens. The image display apparatus 100 may display images corresponding to the first region 310 and the third region 312 located on the left and right of the second region 311 on a second screen 321 and a third screen 322, respectively, among the plurality of screens. However, the number of screens and angles of view of the 360-degree image displayed on the screens may be different according to an embodiment and are not limited to the above-described example.

The user may move the angle of view of the 360-degree image 300 on the first screen 320 among the three screens 320 through 322, thereby viewing the 360-degree image 300 corresponding to various angles of view. For example, the user may move the angle of view of the 360-degree image 300 in a right direction on the first screen 320. In this regard, since a movement direction of the angle of view is the right direction and the third screen 322 is located on the right bottom side of the display, the third screen 322 may inhibit a user's view. Alternatively, the user may move the angle of view of the 360-degree image 300 in a left direction on the first screen 320. In this regard, since the movement direction of the angle of view is a left direction and the second screen 321 is located on the left bottom side of the display, the second screen 321 may inhibit the user's view. Thus, in order to prevent the user's view from being inhibited in the movement direction of the angle of view when the angle of view of the 360-degree image is moved, a method of displaying a plurality of screens is required.

Figure 4:
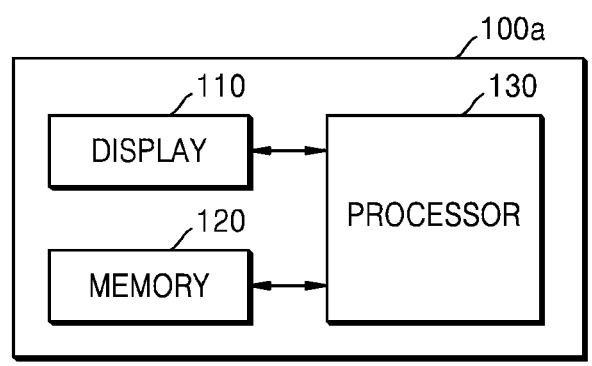
FIG. 4 is a block diagram illustrating an example image display apparatus, according to an example embodiment.

FIG. 4 is a block diagram illustrating an example image display apparatus 100a, according to an example embodiment.

The image display apparatus 100a of FIG. 4 may be an example embodiment of the image display apparatus 100 of FIG. 1. Referring to FIG. 4, the image display apparatus 100a may include a display 110, a memory 120, and a processor (e.g., including processing circuitry) 130. However, the image display apparatus 100a may further include other elements and is not limited thereto.

The above elements will be described below.

The display 110 according to an embodiment may display a 360-degree image on a plurality of screens. The display 110 may display each of the plurality of screens to represent an image corresponding to different angles of view of the 360-degree image.

When the display 110 is embodied as a touch screen, the display 110 may serve as an input device, as well as an output device. For example, the display 110 may include at least one among a liquid crystal display (LCD), a thin-film transistor-LCD, an organic light-emitting diode (OLED) display, a flexible display, a three-dimensional (3D) display, and an electrophoretic display, or the like, but is not limited thereto. The image display apparatus 100a may include two or more displays 110 according to the shape of the image display apparatus 100a.

The memory 120 according to an embodiment may store a program for processing and controlling the processor 130 when the program is executed by the processor 130, and store data input to the image display apparatus 100b or data to be output from the image display apparatus 100b.

The memory 120 may include at least one among a flash memory-type storage medium, a hard disk-type storage medium, a multimedia card micro-type storage medium, a card-type memory (e.g., an SD or XD memory), random access memory (RAM), static random access memory (SRAM), read-only memory (ROM), electrically erasable programmable read-only memory (EEPROM), programmable read-only memory (PROM), a magnetic memory, a magnetic disk, and an optical disc.

The memory 120 according to an embodiment may include a module including at least one instruction for displaying at least a part of the 360-degree image on the plurality of screens in which each of the plurality of screens represents an image corresponding to different angles of view of the 360-degree image, in response to a user input that moves the angle of view of the 360-degree image on one of the plurality of screens, changing display properties of one or more other screens of the plurality of screens, and displaying at least a part of the 360-degree image on the one or more other screens having the changed display properties.

The processor 130 may include the at least one memory and various combinations of processors. For example, the memory 120 may generate or delete a program module according to an operation of the processor 130, and the processor 130 may perform operations of the program module.

The processor 130 according to an embodiment may execute the at least one instruction stored in the memory 120, thereby, in response to the user input that moves the angle of view of the 360-degree image on one of the plurality of screens, changing the display property of one or more other screens of the plurality of screens.

The processor 130 may execute the at least one instruction stored in the memory 120, thereby, in response to a user input that moves the angle of view of the 360-degree image in a predetermined direction on one of the plurality of screens, changing at least one of a location, a size, transparency, and an on/off state of one or more other screens of the plurality of screens. For example, in response to a user input that moves the angle of view of the 360-degree image in a right direction on one of the plurality of screens, the processor 130 may move the location of one or more other screens of the plurality of screens in a left direction, reduce the size of one or more other screens of the plurality of screens, or transparently display one or more other screens of the plurality of screens. Alternatively, according to an embodiment, in response to a user input that moves the angle of view of the 360-degree image in a left direction on one of the plurality of screens, the processor 130 may reduce the size of one or more other screens of the plurality of screens and move the location of one or more other screens of the plurality of screens in the right direction. Accordingly, the processor 130 may control the one or more other screens of the plurality of screens not to inhibit a user's view in a moving direction of the angle of view.

The processor 130 according to an embodiment may execute the at least one instruction stored in the memory 120, thereby controlling the display 110 not to display the one or more other screens while receiving the user input that moves the angle of view of the 360-degree image on one of the plurality of screens. The processor 130 may control the display 110 to display the one or more other screens that have not been displayed since the receiving of the user input that moves the angle of view ends and a predetermined time elapses. Accordingly, the processor 130 may control the display 110 not to display the one or more other screens while moving the angle of view, thereby allowing the one or more other screens not to hide the user's view in the moving direction of the angle of view.

Alternatively, according to an embodiment, the processor 130 may execute the at least one instruction stored in the memory 120, thereby, in response to a user input that selects the one or more other screens since the receiving of the user input that moves the angle of view ends, controlling the display 110 to display the one or more other screens.

Figure 5:
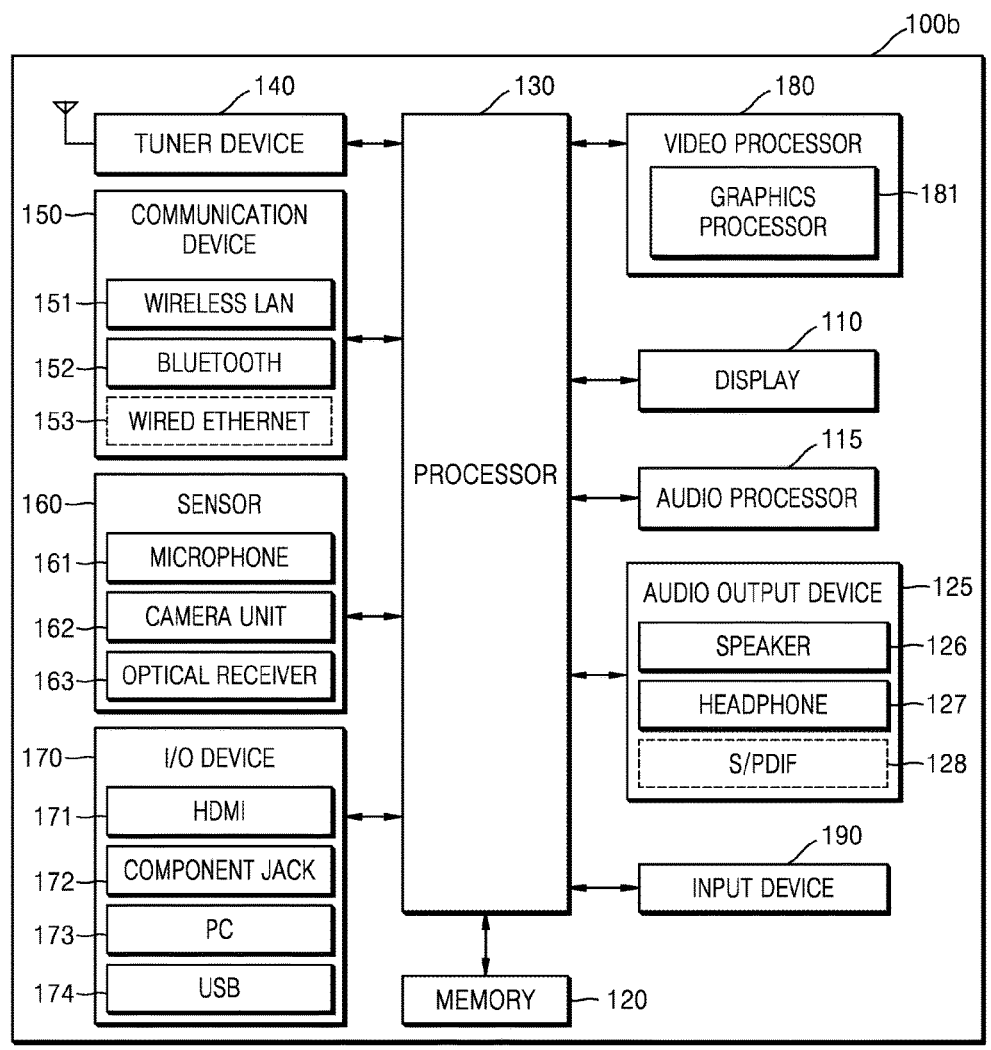
FIG. 5 is a block diagram illustrating an example image display apparatus, according to another example embodiment.

FIG. 5 is a block diagram illustrating an example image display apparatus 100b according to another example embodiment.

Referring to FIG. 5, the image display apparatus 100b may include the display 110, the memory 120, and the processor (e.g., including processing circuitry) 130, and may further include an input device, e.g., a user input device (e.g., including input circuitry) 190, a tuner device 140, a communication device (e.g., including communication circuitry) 150, a sensor 160, an input/output (I/O) unit (e.g., including I/O circuitry) 170, a video processor (e.g., including video processing circuitry) 180, an audio processor (e.g., including audio processing circuitry) 115, and an audio output device (e.g., including audio output circuitry) 125.

In FIG. 5, descriptions of the display 110, the memory 120, and the processor 130 that are the same as those described above with reference to FIG. 4 are omitted.

The input device 190 may include various circuitry for inputting data needed for a user to control the image display apparatus 100b. For example, the input device 190 may include various input circuitry, such as, for example, and without limitation, a keypad, a dome switch, a touch pad (contact-type capacitance method, pressure-type resistive film method, infrared ray detection method, surface ultrasonic wave conduction method, integral-type tension measurement method, piezoelectric effect method, etc.), a jog wheel, a jog switch, etc. but is not limited thereto.

A user input according to an embodiment may refer, for example, to an input to move an angle of view of a 360-degree image on one of a plurality of screens. For example, when the input device 190 is embodied as a keypad or a dome switch, the user input of moving the angle of view may be an input for clicking or pressing a key corresponding to a specific direction. Alternatively, when the input device 190 is embodied as a touch pad, the user input of moving the angle of view may be an input of touching the key corresponding to the specific direction. However, the present disclosure is not limited thereto.

In relation to the user input of moving the angle of view, a degree of change in the angle of view may vary according to a method of clicking or touching a key. For example, when the key is pressed or touched for a predetermined time or more, the angle of view of the 360-degree image may be consecutively moved. When the key is clicked or touched for a short time, the angle of view of the 360-degree image may be moved in units of predetermined angles. For example, whenever a user clicks a key corresponding in a right direction, the angle of view of the 360-degree image may be moved by 30 degrees in the right direction.

The input device 190 may comprise, for example, and without limitation, the control device 101 described above or an element of the image display apparatus 100b.

The display 110 may display video included in a broadcast signal received via the tuner device 140 on a screen thereof under control of the processor 130. Furthermore, the display 110 may display content, e.g., a moving picture, which is input via the communication device 150 or the I/O device 170. The display 110 may output an image stored in the memory 120 under control of the processor 130. The display 110 may display a voice user interface (UI) (for example, including a voice command guide) for performing a voice recognition task corresponding to voice recognition or a motion UI (for example, including a user motion guide for motion recognition) for performing a motion recognition task corresponding to motion recognition.

The audio processor 115 may include various circuitry that processes audio data. The audio processor 115 may perform various processing operations, such as decoding, amplification, or noise filtering, on the audio data. The audio processor 115 may include a plurality of audio processing modules including circuitry for processing audio corresponding to a plurality of pieces of content.

The audio output device 125 may include various circuitry to output audio included in a broadcast signal received via the tuner device 140 under control of the processor 130. The audio output device 125 may output audio (for example, voice and sound) input via the communication device 150 or the I/O device 170. The audio output device 125 may output audio stored in the memory 120, under control of the processor 130. The audio output device 125 may include various audio output circuitry, such as, for example, and without limitation, at least one among a speaker 126, a headphone output terminal 127, and a Sony/Philips Digital Interface (S/PDIF) output terminal 128. The audio output device 125 may include a combination of the speaker 126, the headphone output terminal 127, and the S/PDIF output terminal 128.

The tuner device 140 may include various tuning circuitry and tune and select a frequency of a channel to be received by the image display apparatus 100b from among many radio wave components by performing amplification, mixing, resonance, or the like on a broadcast signal received by wire or wirelessly. The broadcast signal includes audio, video, and additional information such as an electronic program guide (EPG).

The tuner device 140 may receive a broadcast signal in a frequency band corresponding to a channel number (for example, a cable broadcast #506) according to a user input (for example, a control signal received from the control device 101, for example, a channel number input, a channel up-down input, and a channel input on an EPG screen).

The tuner device 140 may receive a broadcast signal from various sources such as terrestrial broadcasting, cable broadcasting, satellite broadcasting, Internet broadcasting, etc. The tuner device 140 may receive a broadcast signal from a source such as analog broadcasting, digital broadcasting, etc. Decoding, e.g., audio-decoding, video-decoding, or additional-information decoding, is performed to divide the broadcast signal received via the tuner device 140 into audio, video and/or additional information. The audio, the video and/or the additional information may be stored in the memory 120 under control of the processor 130.

In the image display apparatus 100b, one or more tuner devices 140 may be provided. The tuner device 140 may be integrated with the image display apparatus 100b in an all-in-one structure or may be embodied as a separate device having a tuner electrically connected to the image display apparatus 100*b*, e.g., a set-top box (not shown) or a turner unit (not shown) connected to the I/O unit 170.

The communication device 150 may include various communication circuitry to connect the image display apparatus 100*b* to an external device (e.g., an audio device or the like) under control of the processor 130. The processor 130 may transmit content to or receive content from an external device connected thereto via the communication device 150, download an application from the external device, or perform web browsing. The communication device 150 may include various communication circuitry, such as, for example, and without limitation, at least one among a wireless local area network (LAN) communication device 151, a Bluetooth communication device 152, and a wired Ethernet communication device 153 according to the performance and structure of the image display apparatus 100*b*. Alternatively, the communication unit 150 may include a combination of the wireless LAN communication device 151, the Bluetooth communication device 152, and the wired Ethernet communication device 153. The communication device 150 may receive a control signal of the control device 101 under control of the processor 130. The control signal may be embodied as a Bluetooth type, a radio-frequency (RF) signal type, or a Wi-Fi type.

The communication device 150 may further include another short-range communication (e.g., near-field communication (NFC) (not shown) or Bluetooth low energy (BLE) (not shown), as well as Bluetooth) device.

The sensor 160 may sense a user's voice, image, or interaction, and may include a microphone 161, a camera unit 162, and an optical receiver 163.

The microphone 161 receives a user's voice. The microphone 161 may convert the received user's voice into an electrical signal and output the electrical signal to the processor 130. The user's voice may include, for example, voice corresponding to a menu of the image display apparatus 100*b* or a function.

The camera unit 162 may receive an image (e.g., consecutive frames) corresponding to a user's motion, including a gesture, within a range of camera recognition. The processor 130 may use a recognition result of the received motion to select the menu displayed on the image display apparatus 100*b* or perform control corresponding to a motion recognition result. For example, a channel adjustment, a volume adjustment, an indicator movement, and a cursor movement.

The optical receiver 163 receives an optical signal (including a control signal) from an external control device 101 on an optical window (not shown) of a bezel of the display 110. The optical receiver 163 may receive an optical signal corresponding to a user input (e.g., a user's touch, pressing, touch gesture, voice, or motion) from the external control device 101. A control signal may be extracted from the received optical signal under control of the processor 130.

The I/O device 170 may include various I/O circuitry and receives video (e.g., a moving picture), audio (e.g., voice or sound), additional information (e.g., an EPG), etc. from the outside of the image display apparatus 100*b*, under control of the processor 130. The I/O device 170 may include various I/O circuitry, such as, for example, and without limitation, at least one among a high-definition multimedia interface (HDMI) port 171, a component jack 172, a PC port 173, and a universal serial bus (USB) port 174. Alternatively, the I/O device 170 may include a combination of the HDMI port 171, the component jack 172, the PC port 173, and the USB port 174.

The processor 130 may include various processing circuitry and controls all operations of the image display apparatus 100*b* and the flow of a signal between internal elements of the image display apparatus 100*b*, and processes data. When a user input is received or a stored predetermined condition is satisfied, the processor 130 may run an operating system (OS) and various applications stored in the memory 120.

The block diagrams of the image display apparatuses 100*a* and 100*b* of FIGS. 4 and 5 are merely examples. Some elements of the block diagrams may be integrated or omitted or additional elements may be added according to the specifications of the image display apparatuses 100*a* and 100*b* actually embodied. For example, two or more elements may be integrated into one element or one element may be divided into two or more elements if necessary. Furthermore, the functions of these elements are examples cited to describe embodiments and thus the scope of the present disclosure is not limited by particular operations or devices.

Figure 6A:
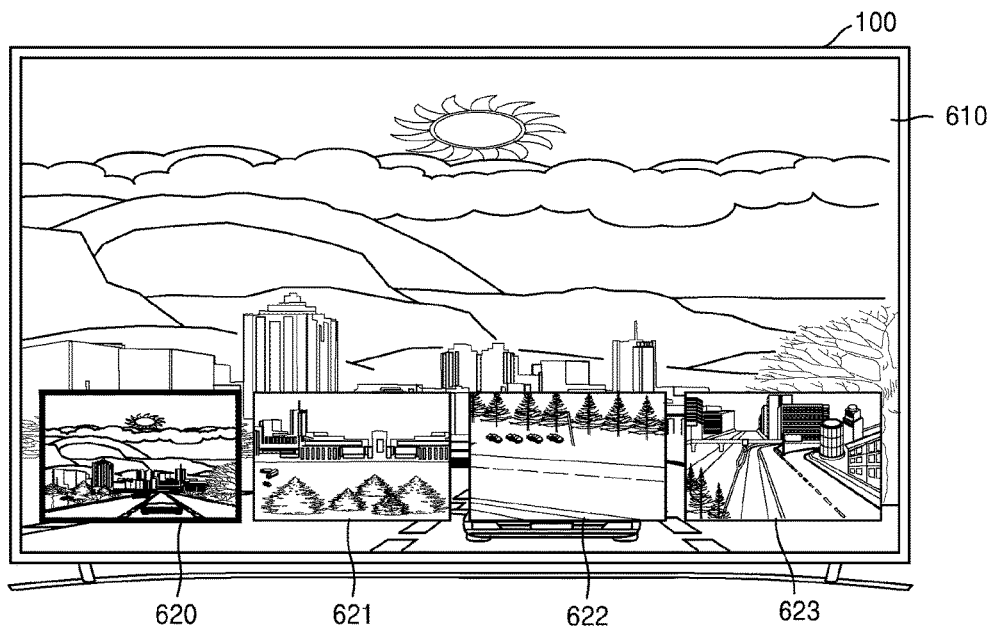
FIGS. 6A and 6B are diagrams illustrating an example method of displaying a plurality of screens, according to an example embodiment.
Figure 6B:
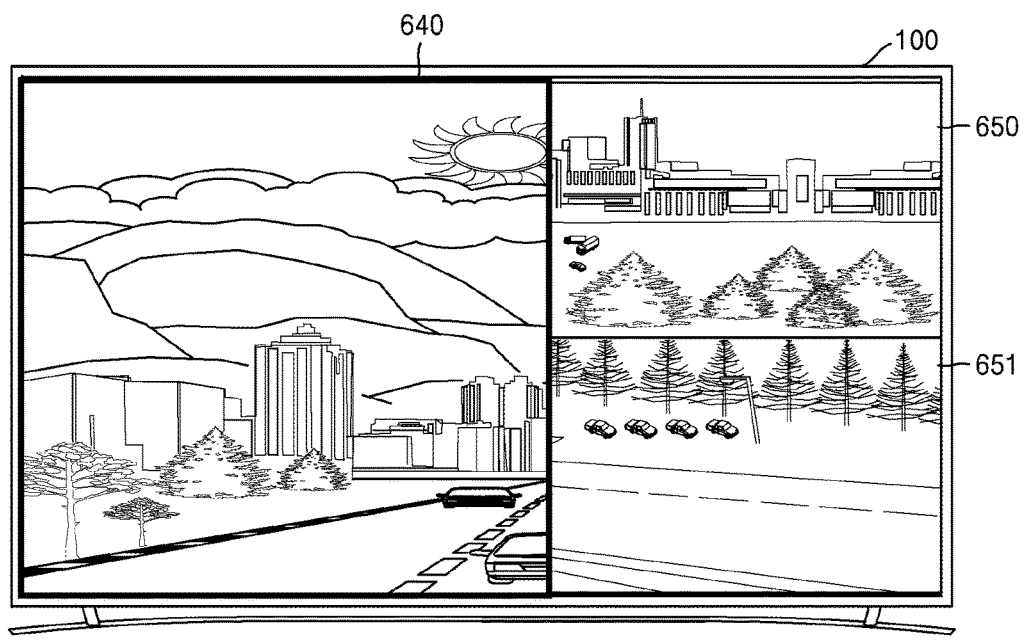

FIGS. 6A and 6B are diagrams illustrating an example method of displaying a plurality of screens, according to an example embodiment.

The image display apparatus 100 according to an embodiment may display at least a part of a 360-degree image on the plurality of screens. Each of the plurality of screens may be an image corresponding to each of different angles of view of the 360-degree image.

For example, referring to FIG. 6A, the image display apparatus 100 may display an image corresponding to a predetermined angle of view selected by a user in the 360-degree image on a first screen 610 of the plurality of screens. The image display apparatus 100 may display the image corresponding to each of different angles of view of the 360-degree image on a plurality of second screens 620, 621, 622 and 623. In this regard, one of the plurality of second screens 620 through 623 may represent an image displayed on the first screen 610. For example, the leftmost second screen 620 of the plurality of second screens 620 through 623 may represent the image displayed on the first screen 610. In addition, three second screens 621 through 623 of the plurality of second screens 620 through 623 may represent the images corresponding to the right, the back, and the left with respect to the image 620 displayed on the first screen 610. For example, when the image displayed on the first screen 610 is an image corresponding to 0 degrees, the image corresponding to the right of the image displayed on the first screen 610 may mean an image having an angle of view corresponding to 90 degrees, and the image corresponding to the back of the image displayed on the first screen 610 may mean an image having an angle of view corresponding to 270 degrees. However, an angle of view of the 360-degree image displayed on a plurality of second screens may different according to an embodiment and is not limited thereto.

In response to a user input that selects one of the plurality of second screens 620 through 623, the image display apparatus 100 may display an image displayed on the selected second screen on the first screen 610. Since the image displayed on the first screen 610 is changed, images displayed on the plurality of second screens 620 through 623 may also be changed.

Also, the image display apparatus 100 may individually move angles of view of the 360-degree image on the plurality of second screens 620 through 623. For example, the image display apparatus 100 may move the angle of view from 90 degrees to 120 degrees with respect to the second screen 621 and the angle of view from 270 degrees to 240 degrees with respect to the other second screen 623.

Also, to move the angle of view on the first screen 610 or one of the plurality of second screens 620 through 623, the image display apparatus 100 may receive a command to move a focus to a screen to which the angle of view is moved. For example, a user may move the focus to the screen in order to move the angle of view to one screen, and, if the focus is moved to the screen, may move the angle of view of the 360-degree image on the screen.

The image display apparatus 100, as illustrated in FIG. 6A, may overlap and display the first screen 610 and the plurality of second screens 620 through 623. However, according to an embodiment, the image display apparatus 100 may not overlap and display a plurality of screens indicating the 360-degree image.

Referring to FIG. 6B, the image display apparatus 100 may not overlap and display a plurality of screens 640, 650, and 651 indicating images corresponding to different angles of view of the 360-degree image. For example, the image display apparatus 100 may display a first image corresponding to a predetermined angle of view selected by the user on the screen 640 among the three screens 640, 650, and 651. The image display apparatus 100 may display a second image corresponding to an angle of view different from the first image on the two screens 650 and 651 among the three screens 640, 650, and 651. For example, the second image may include the image 650 corresponding to the right and the image 651 corresponding to the left with respect to the first image but is not limited thereto.

FIGS. 7A and 7B are diagrams illustrating an example method of changing locations of a plurality of screens, according to an example embodiment.

Referring to FIG. 7A, the image display apparatus 100 may display at least a part of a 360-degree image on a plurality of screens 710 and 720, 721, 722 and 732. Among the plurality of screens 710 and 720 through 732, the first screen 710 may be a screen that occupies a full screen of a display, and the second screens 720 through 723 may be screens that overlap the first screen 710. Each of the plurality of screens 710 and 720 through 732 may represent an image corresponding to different angles of view of the 360-degree image. The image display apparatus 100 may display an image corresponding to a changed angle of view on the first screen 710 in response to a user input that moves angles of view of the 360-degree image on the first screen 710. In this regard, since the angle of view of the 360-degree image displayed on the first screen 710 is changed, the angle of view of the 360-degree image displayed on the second screens 720 through 723 among the plurality of screens 710 and 720 through 732 may be changed.

The image display apparatus 100 may change display properties of the screens 720 through 723 in response to a user input that moves the angle of view of the 360-degree image on the first screen 710. For example, the display property may include a location, a size, and an on/off state of a screen but is not limited thereto. An on/off state of the screen may mean a property indicating whether the screen is displayed on the display 110 of the image display apparatus 100. For example, when the second screens 720 through 723 are in an off state, the image display apparatus 100 may not display the second screens 720 through 723.

Various embodiments in which in response to a user input that moves the angle of view of the 360-degree on the first screen 710, display properties of the second screens 720 through 723 are changed will be described in detail with reference to FIGS. 7A through 10B.

For example, in response to a user input that moves the angle of view of the 360-degree image in a predetermined direction on the first screen 710, the second screens 720 through 723 may be moved in an opposite direction to a movement direction of the angle of view.

Referring to FIG. 7A, in response to a user input 701 that moves the angle of view in a right direction on the first screen 710, the image display apparatus 100 may move locations of the second screens 720 through 723 in a left direction. Alternatively, referring to FIG. 7B, the image display apparatus 100 may move locations of one or more second screens 740, 741, 742 and 743 in the right direction in response to a user input that moves an angle of view in a left direction on a first screen 730. Accordingly, the image display apparatus 100 may move the locations of second screens 740 through 743 in an opposite direction to a movement direction of the angle of view, thereby controlling the second screens 740 through 743 not to hide a user's view in the movement direction of the angle of view.

FIG. 8 is a diagram illustrating an example method of changing sizes of a plurality of screens, according to an example embodiment.

The image display apparatus 100 may reduce sizes of one or more second screens in response to a user input that moves an angle of view of a 360-degree image in a predetermined direction on a first screen among the plurality of screens.

Referring to FIG. 8, the image display apparatus 100 may reduce sizes of the one or more second screens 820, 821, 822 and 823 in response to a user input 801 that moves an angle of view of a 360-degree image in a predetermined direction on a first screen 810.

According to an embodiment, the image display apparatus 100 may reduce the sizes of the second screens 820 through 823, move locations thereof, or change transparency thereof in response to the user input 801 that moves the angle of view of the 360-degree image in the predetermined direction on the first screen 810. However, a method of changing display properties of the second screens 820 through 823 may be different according to embodiments and is not limited to the above-described example. Accordingly, the image display apparatus 100 may reduce the sizes of the second screens 820 through 823 when receiving the user input 801 that moves the angle of view of the 360-degree image in the predetermined direction on the first screen 810, thereby more effectively securing a user's view in a movement direction of the angle of view.

FIGS. 9A and 9B are diagrams illustrating an example method of changing transparency of a plurality of screens, according to an example embodiment.

The image display apparatus 100 according to an embodiment may change transparency of one or more second screens in response to a user input that moves an angle of view of a 360-degree image in a predetermined direction on a first screen.

Referring to FIG. 9A, the image display apparatus 100 may increase transparency of one or more second screens 920, 921, 922 and 923 in response to a user input 901 that moves an angle of view of a 360-degree image in a predetermined direction on a first screen 910. Accordingly, the image display apparatus 100 may control the one or more second screens 920 through 923 not to hide a user's view in a movement direction of the angle of view.

According to an embodiment, the image display apparatus 100 may change display properties of two or more of locations, sizes, and transparency of the second screens 920 through 923. For example, the image display apparatus 100 may reduce sizes of the one or more second screens 920 through 923 and change transparency thereof in response to the user input 901 that moves the angle of view of the 360-degree image in the predetermined direction on the first screen 910. Alternatively, the image display apparatus 100 may change transparency of the one or more second screens 920 through 923 while moving the locations of the one or more second screens 920 through 923 in an opposite direction to the movement direction of the angle of view.

Referring to FIG. 9B, the image display apparatus 100 may reduce sizes of one or more second screens 940, 941, 942 and 943 and change transparency thereof when receiving a user input 911 that moves the angle of view of the 360-degree image in the predetermined direction on a first screen 930.

FIGS. 10A and 10B are diagrams illustrating an example method of changing an on/off state of a plurality of screens, according to an example embodiment.

The image display apparatus 100 according to an embodiment may control the display 1010 to not display one or more second screens when receiving a user input that moves an angle of view of a 360-degree image on a first screen.

Referring to FIG. 10A, the image display apparatus 100 may control one or more second screens among the plurality of screens not to be displayed on the display 1010 when receiving a user input 1001 that moves the angle of view on a first screen 1010 among the plurality of screens.

When a preset condition is set, the image display apparatus 100 may again display the one or more second screens that have not been displayed when receiving the user input 1001 that moves the angle of view. For example, since the receiving of the user input 1001 that moves the angle of view ends and a predetermined time elapses, the image display apparatus 100 may again display the one or more second screens that have not been displayed. For example, if the receiving of the user input 1001 that moves the angle of view ends and 3 seconds elapse, the image display apparatus 100 may again display the one or more second screens without any user input. Alternatively, according to an embodiment, the image display apparatus 100 may again display one or more second screens that have not been displayed in response to a user input that selects the second screens.

For example, referring to FIG. 10B, a user may select a button 1011 that displays a second screen from the control device 101. The image display apparatus 100 may again display the second screens 1040, 1041, 1042 and 1043 that have not been displayed when receiving the user input 1001 that moves the angle of view. Thus, the image display apparatus 100 may change an on/off state of the second screens 1040 through 1043 when receiving the user input 1001 that moves the angle of view according to user convenience.

Figure 11:
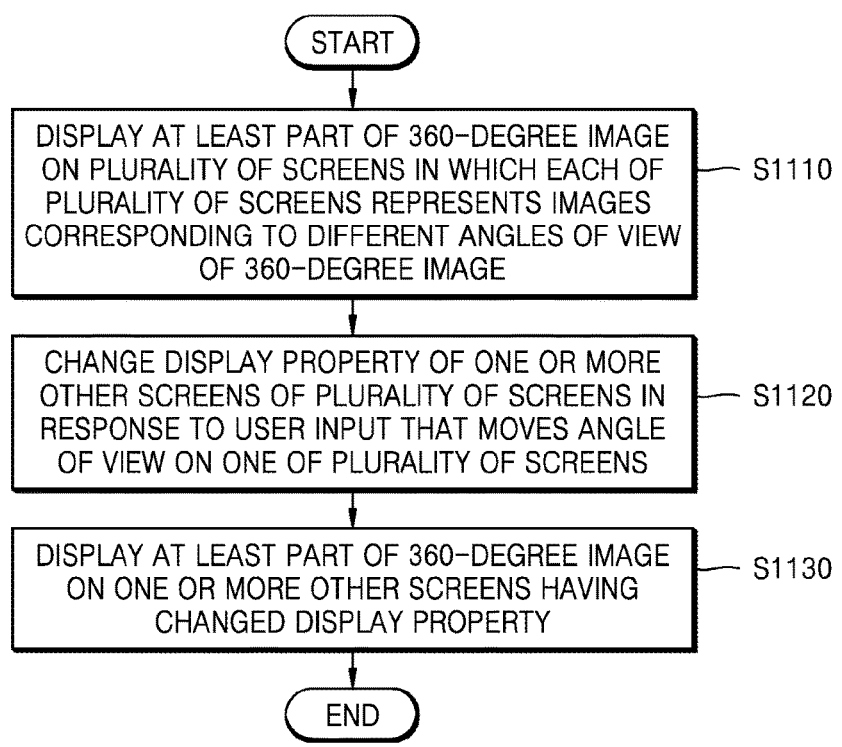
FIG. 11 is a flowchart illustrating an example method of displaying an image according to an example embodiment.

FIG. 11 is a flowchart illustrating an example method of displaying an image according to an example embodiment.

In operation S1110, the image display apparatus 100 may display at least a part of a 360-degree image on a plurality of screens in which each of the plurality of screens represents an image corresponding to different angles of view of the 360-degree image.

In operation S1120, the image display apparatus 100 may change display properties of one or more other screens among the plurality of screens in response to a user input that moves an angle of view on one of the plurality of screens.

For example, a display property of a screen may include a location of the screen, a size, transparency, and an on/off state thereof but is not limited thereto.

In response to a user input that moves an angle of view of a 360-degree image in a predetermined direction on one of the plurality of screens, the image display apparatus 100 may move one or more other screens in an opposite direction to a movement direction of the angle of view. For example, in response to a user input that moves the angle of view of the 360-degree image in a right direction on one of the plurality of screens, the image display apparatus 100 may move one or more second screens among the plurality of screens in a left direction. Accordingly, the image display apparatus 100 may move locations of the one or more second screens so that the one or more second screens do not hide a user's view in a movement direction of the angle of view.

Also, the image display apparatus 100 may reduce sizes of the one or more other screens in response to a user input that moves the angle of view of the 360-degree image on one of the plurality of screens.

According to an embodiment, the image display apparatus 100 may reduce transparency of the one or more other screens in response to a user input that moves the angle of view of the 360-degree image on one of the plurality of screens.

The image display apparatus 100 may control the display 110 not to display the one or more other screens while receiving a user input that moves the angle of view of the 360-degree image on one of the plurality of screens. As receiving of the user input that moves the angle of view ends and a predetermined time elapses, the image display apparatus 100 may control the one or more other screens that have not been displayed to be displayed again. Alternatively, according to an embodiment, as receiving of the user input that moves the angle of view ends, in response to a user input that selects the one or more other screens, the image display apparatus 100 may control the display 110 to display the one or more other screens again. Accordingly, the image display apparatus 100 may control the one or more other screens not to be displayed on the display 110 when the angle of view moves, thereby preventing the one or more other screens from inhibiting a user's view in a movement direction of the angle of view.

In operation S1130, the image display apparatus 100 may display at least a part of the 360-degree image on the one or more other screens having the changed display properties.

The embodiments set forth herein may be embodied as program commands executable through various computer means and recorded on a computer-readable recording medium. The computer-readable recording medium may include a program command, a data file, and a data structure solely or in combination. The program commands recorded on the computer-readable recording medium may be specifically designed and configured for the present disclosure, or may be well known to and usable by one of ordinary skill in the art of computer software. Examples of the computer-readable recording medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories). Examples of the program commands include not only machine language code prepared by a compiler, but also high-level language code executable by a computer by using an interpreter.

The above description of the present disclosure is provided for the purpose of illustration, and it would be understood by those skilled in the art that various changes and modifications may be made without changing the technical concept and essential features of the present disclosure. Thus, it is clear that the above embodiments are illustrative in all aspects and do not limit the present disclosure. For example, each component described to be of a single type can be implemented in a distributed manner. Similarly, each component described to be distributed may be combined together.

The scope of the present disclosure is defined not by the detailed description of the present disclosure but by the appended claims, and all changes or modifications derived from the meanings and scope of the claims and equivalents of the claims should be understood as being included in the scope of the present disclosure.

What is claimed is:

1. An image display apparatus configured to display a 360-degree image, the image display apparatus comprising:
a display;
a memory comprising at least one instruction; and
a processor, by executing the at least one instruction stored in the memory, configured:
to control the display to display at least a part of a 360-degree image on a plurality of screens in which each of the plurality of screens represents images corresponding to different angles of view of the 360-degree image,
to change display properties of other screens of the plurality of screens in response to receiving an input to move an angle of view on one of the plurality of screens, and
to control the display to display at least a part of the 360-degree image on the other screens having the changed display properties, wherein the display properties comprise at least one of locations, sizes, transparency, and an on/off state of the one or more other screens.

2. The image display apparatus of claim 1, wherein the processor, by executing the at least one instruction stored in the memory, is configured to move the other screens of the plurality of screens in a direction opposite to a predetermined direction in response to an input to move the angles of view of the 360-degree image in the predetermined direction on the one of the plurality of screens.

3. The image display apparatus of claim 1, wherein the processor, by executing the at least one instruction stored in the memory, is configured to reduce sizes of the other screens of the plurality of screens in response to an input to move the angles of view of the 360-degree image on the one of the plurality of screens.

4. The image display apparatus of claim 1, wherein the processor, by executing the at least one instruction stored in the memory, is configured to change transparency of the other screens of the plurality of screens in response to an input to move the angles of view of the 360-degree image on the one of the plurality of screens.

5. The image display apparatus of claim 1, wherein the processor, by executing the at least one instruction stored in the memory, is configured to control the display to not display the other screens of the plurality of screens while receiving an input to move the angles of view of the 360-degree image on the one of the plurality of screens.

6. The image display apparatus of claim 5, wherein the processor, by executing the at least one instruction stored in the memory, is configured to control the display to display again the other screens of the plurality of screens that have not been displayed since receiving of the input to move the angles of view of the 360-degree image ends and a predetermined time elapses.

7. The image display apparatus of claim 5, wherein the processor, by executing the at least one instruction stored in the memory, is configured to control the display to display again the other screens of the plurality of screens that have not been displayed in response to an input that selects the other screens since receiving of the input to move the angles of view of the 360-degree image ends.

8. The image display apparatus of claim 1, further comprising: an input device comprising input circuitry configured to receive an input to move the angles of view of the 360-degree image.

9. The image display apparatus of claim 1, wherein the processor, by executing the at least one instruction stored in the memory, is configured to change angles of view of the other screens of the plurality of screens, in response to the receiving of the input to move the angle of view on the one of the plurality of screens.

10. A method of displaying a 360-degree image, the method comprising:
displaying at least a part of a 360-degree image on a plurality of screens in which each of the plurality of screens represents images corresponding to different angles of view of the 360-degree image;
changing display properties of other screens of the plurality of screens in response to receiving an input to move an angle of view on one of the plurality of screens; and
displaying at least a part of the 360-degree image on the other screens having the changed display properties,
wherein the display properties comprise at least one of locations, sizes, transparency, and an on/off state of the other screens.

11. The method of claim 10, wherein the changing of the display properties of the other screens comprises: moving the other screens of the plurality of screens in an opposite direction to a predetermined direction in response to an input to move the angles of view of the 360-degree image in the predetermined direction on the one of the plurality of screens.

12. The method of claim 10, wherein the changing of the display properties of the other screens comprises: reducing sizes of the other screens of the plurality of screens in response to an input that moves the angles of view of the 360-degree image on the one of the plurality of screens.

13. The method of claim 10, wherein the changing of the display properties of the other screens comprises: changing transparency of the other screens of the plurality of screens in response to an input to move the angles of view of the 360-degree image on the one of the plurality of screens.

14. The method of claim 10, wherein the changing of the display properties of the other screens comprises: controlling the other screens of the plurality of screens to not be displayed when receiving an input to move the angles of view of the 360-degree image on the one of the plurality of screens.

15. The method of claim 14, further comprising: displaying again the other screens of the plurality of screens that have not been displayed since receiving of the input to move the angles of view of the 360-degree image ends and a predetermined time elapses.

16. The method of claim 14, further comprising: displaying again the other screens of the plurality of screens that have not been displayed in response to an input that selects the other screens since receiving of the input to move the angles of view of the 360-degree image ends.

17. The method of claim 10, further comprising: receiving an input to move the angles of view of the 360-degree image.

18. A non-transitory computer-readable recording medium having recorded thereon a program for performing the method of displaying a 360-degree image of claim 10.

* * * * *